(12) United States Patent
Kishima

(10) Patent No.: US 10,882,565 B2
(45) Date of Patent: Jan. 5, 2021

(54) FENDER LINER

(71) Applicant: TOYOTA JIDOSHA KABUSHIKI KAISHA, Toyota (JP)

(72) Inventor: Fumihiko Kishima, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 16/225,026

(22) Filed: Dec. 19, 2018

(65) Prior Publication Data

US 2019/0202501 A1    Jul. 4, 2019

(30) Foreign Application Priority Data

Dec. 28, 2017    (JP) .................................. 2017-254742

(51) Int. Cl.
*B62D 25/18*    (2006.01)
*B62D 35/02*    (2006.01)

(52) U.S. Cl.
CPC .............. *B62D 25/18* (2013.01); *B62D 35/02* (2013.01)

(58) Field of Classification Search
CPC ................................ B62D 25/18; B62D 35/08
See application file for complete search history.

(56) References Cited

FOREIGN PATENT DOCUMENTS

| JP | 2013-233887 | 11/2013 | |
| JP | 2016-007875 | 1/2016 | |
| WO | WO-2018140848 A1 * | 8/2018 | ............. A63H 17/00 |

* cited by examiner

*Primary Examiner* — D Glenn Dayoan
*Assistant Examiner* — Melissa Ann Bonifazi
(74) *Attorney, Agent, or Firm* — Oblon, McClelland, Maier & Neustadt, L.L.P.

(57) ABSTRACT

A fender liner includes a fender liner body provided in an arch of a fender included in a wheel house of a vehicle. The fender liner body includes a recess that is provided from an upper portion of the fender liner body in a vehicle height direction to a rear portion of the fender liner body in a vehicle front-rear direction and is greatly recessed rearward in the vehicle front-rear direction more in the rear portion than in the upper portion.

10 Claims, 12 Drawing Sheets

FENDER LINER

INCORPORATION BY REFERENCE

The disclosure of Japanese Patent Application No. 2017-254742 filed on Dec. 28, 2017 including the specification, drawings and abstract is incorporated herein by reference in its entirety.

BACKGROUND

1. Technical Field

The present disclosure relates to a fender liner.

2. Description of Related Art

A structure in which a duct is formed at a lower position of a rear portion of a fender liner provided in a wheel house so as to reduce air resistance during vehicle traveling is proposed in a related art (for example, see Japanese Patent Application Publication No. 2013-233887). Further, there is a related art that proposes a structure in which a plurality of hemispheric recesses is formed to an end on the outer side of a fender liner in the vehicle width direction so as to switch air flow flowing outward to air flow flowing downward during vehicle traveling (for example, see Japanese Patent Application Publication No. 2016-7875).

SUMMARY

During vehicle traveling, air blows out from a clearance gap defined between an upper portion of each tire and an upper portion of each fender liner, and from a clearance gap defined between a rear portion of each tire and a rear portion of each fender liner to the outside of the vehicle. Negative pressure is generated on both lateral surfaces of the vehicle due to the air blowing from the respective clearance gaps. However, peaks of the negative pressures are different in the front portion and in the rear portion.

Hence, during the vehicle traveling, the air blowing out from the clearance gap defined between the upper portion of each tire and the upper portion of each fender liner is attracted by the air blowing out from the clearance gap defined between the rear portion of each tire and the rear portion of each fender liner, so that vortex might be generated on each lateral side of the vehicle. The vortex thus generated might increase the air resistance.

The present disclosure provides a fender liner capable of reducing air resistance during vehicle traveling.

A first aspect of the disclosure provides a fender liner including a fender liner body provided in an arch of a fender included in a wheel house of a vehicle. The fender liner body includes a recess that is provided from an upper portion of the fender liner body in a vehicle height direction to a rear portion of the fender liner body in a vehicle front-rear direction and is greatly recessed rearward in the vehicle front-rear direction more in the rear portion than in the upper portion.

According to the above aspect, the recess that is recessed more rearward in the rear portion than in the upper portion is provided in such a manner as to range from the upper portion to the rear portion of the fender liner body provided in the arch of the fender included in the wheel house of the vehicle. The air having blown into the recess becomes more difficult to come out from the inside of the recess as the depth of the recess is deeper. Consequently, the air is more difficult to blow out to the outside of the vehicle, from the clearance gap defined between the rear portion of the tire and the rear portion of the fender liner than from the clearance gap defined between the upper portion of the tire and the upper portion of the fender liner. This means that on the rear side of each tire, the generation of negative pressure is suppressed, and thus the generation of vortex is also suppressed at each lateral side of the vehicle. Accordingly, the air resistance is reduced during the vehicle traveling.

In the first aspect, the fender liner may include an edge formed by an end of the fender liner body located more outward in a vehicle width direction than the recess, and the arch of the fender joined to each other, the edge projecting in a sharp angled shape in sectional view perpendicular to the vehicle height direction. An interior angle of the edge in the rear portion may be set to be smaller than an interior angle of the edge in the upper portion.

The air having blown into the recess becomes more difficult to come out from the inside of the recess as the interior angle of the edge is smaller. Therefore, according to the above configuration, the air becomes further more difficult to blow out to the outside of the vehicle from the clearance gap defined between the rear portion of the tire and the rear portion of the fender liner. That is, on the rear side of each tire, the generation of negative pressure is further suppressed, and the generation of vortex is thus further suppressed on each lateral side of the vehicle. Accordingly, during the vehicle traveling, the air resistance is further reduced.

In the first aspect, the fender liner may include a projection formed by an end of the fender liner body located more outward in a vehicle width direction than the recess, and the arch joined to each other, the projection projecting in a rectangular shape in sectional view perpendicular to the vehicle height direction. A thickness of the projection along the vehicle width direction in the rear portion may be smaller than a thickness of the projection along the vehicle width direction in the upper portion.

The air having blown into the recess becomes more difficult to come out from the inside of the recess as the thickness of the projection is smaller. Therefore, according to the above configuration, the air becomes further more difficult to blow out to the outside of the vehicle from the clearance gap defined between the rear portion of the tire and the rear portion of the fender liner. That is, on the rear side of each tire, the generation of negative pressure is further suppressed, and the generation of vortex is thus further suppressed on each lateral side of the vehicle. Accordingly, during the vehicle traveling, the air resistance is further reduced.

In the first aspect, the fender liner body may include a bent portion that is provided at an end of the fender liner body located more outward in a vehicle width direction than the recess and is formed in a substantially L shape in sectional view perpendicular to the vehicle height direction, and a distance from the arch of the fender to the bent portion in the rear portion may be longer than a distance from the arch of the fender to the bent portion in the upper portion.

The air having blown into the recess becomes more difficult to come out from the inside of the recess as the distance from the arch of the fender to the bent portion is longer. Therefore, according to the above configuration, the air becomes further more difficult to blow out to the outside of the vehicle from the clearance gap defined between the rear portion of the tire and the rear portion of the fender liner. That is, on the rear side of each tire, the generation of negative pressure is further suppressed, and the generation of vortex is thus further suppressed on each lateral side of the vehicle. Accordingly, during the vehicle traveling, the air resistance is further reduced.

In the first aspect, the recess may include a deepest portion in the rear portion, the deepest portion being a portion at which a depth of the recess along the vehicle front-rear direction becomes the deepest.

A second aspect of the disclosure provides a fender liner including: a fender liner body provided in an arch of a fender included in a wheel house of a vehicle, the fender liner body including a recess that is provided from an upper portion in a vehicle height direction of the fender liner body to a rear portion in a vehicle front-rear direction of the fender liner body; and an edge formed by an end of the fender liner body located more outward in a vehicle width direction than the recess and the arch joined to each other, the edge projecting in a sharp angled shape in sectional view perpendicular to the vehicle height direction, the edge having a smaller interior angle in the rear portion than an interior angle in the upper portion.

The air having blown into the recess becomes more difficult to come out from the inside of the recess as the interior angle of the edge is smaller. Therefore, according to the second aspect, the air becomes more difficult to blow out to the outside of the vehicle from the clearance gap defined between the rear portion of the tire and the rear portion of the fender liner than from the clearance gap defined between the upper portion of the tire and the upper portion of the fender liner. That is, on the rear side of each tire, the generation of negative pressure is suppressed, and the generation of vortex is thus suppressed on each lateral side of the vehicle. Accordingly, during the vehicle traveling, the air resistance is reduced.

A third aspect of the disclosure provides a fender liner including: a fender liner body provided in an arch of a fender included in a wheel house of a vehicle, the fender liner body including a recess that is provided from an upper portion in a vehicle height direction of the fender liner body to a rear portion in a vehicle front-rear direction of the fender liner body; and a projection formed by an end of the fender liner body located more outward in a vehicle width direction than the recess, and the arch joined to each other, the projection projecting in a rectangular shape in sectional view perpendicular to the vehicle height direction. A thickness of the projection along the vehicle width direction in the rear portion is smaller than a thickness of the projection along the vehicle width direction in the upper portion.

The air having blown into the recess becomes more difficult to come out from the inside of the recess as the thickness of the projection is smaller. Therefore, according to the third aspect, the air becomes more difficult to blow out to the outside of the vehicle from the clearance gap defined between the rear portion of the tire and the rear portion of the fender liner than from the clearance gap defined between the upper portion of the tire and the upper portion of the fender liner. That is, on the rear side of each tire, the generation of negative pressure is suppressed, and the generation of vortex is thus suppressed on each lateral side of the vehicle. Accordingly, during the vehicle traveling, the air resistance is reduced.

In the first to third aspects, as seen in a vehicle width direction, the upper portion may be defined as a region ranging from a contact point of an imaginary tangential line of an end of the fender liner body located more outward in the vehicle width direction than the recess, the imaginary tangential line extending along the vehicle front-rear direction, to an intersection point between the end of the fender liner body and an imaginary oblique line inclined at an angle of 45 degrees relative to the vehicle front-rear direction and the vehicle height direction, and the rear portion may be defined as a region located more downward in the vehicle height direction than the intersection point.

According to the above configuration, compared with the case in which the rear portion of the recess is defined as a region located more upward in the vehicle than the intersection point relative to the imaginary oblique line, the air becomes further more difficult to blow out from the clearance gap defined between the rear portion of the tire and the rear portion of the fender liner to the outside of the vehicle. That is, on the rear side of each tire, the generation of negative pressure is further suppressed, to thereby further suppress the generation of vortex on each lateral side of the vehicle. Accordingly, the air resistance is further reduced during the vehicle traveling. Note that "45 degrees" in the present specification includes not only strict 45 degrees but also approximate 45 degrees having a slight error.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments according to the present disclosure will be described in detail with reference to the drawings. For convenience of explanation, as will be appropriately shown in each drawing, an arrow UP indicates a vehicle upward direction, an arrow FR indicates a vehicle frontward direction, and an arrow LH indicates a vehicle leftward direction. Therefore, in the following description, when up and down, front and rear, or right and left are described unless otherwise specifically mentioned, they indicate up and down in the vehicle height direction, front and rear in the vehicle front-rear direction, and right and left in the vehicle lateral direction (vehicle width direction), respectively. In the present embodiment, a wheel house 14 on the left of the front side of a vehicle 10 will be exemplified.

First Embodiment

Figure 1:
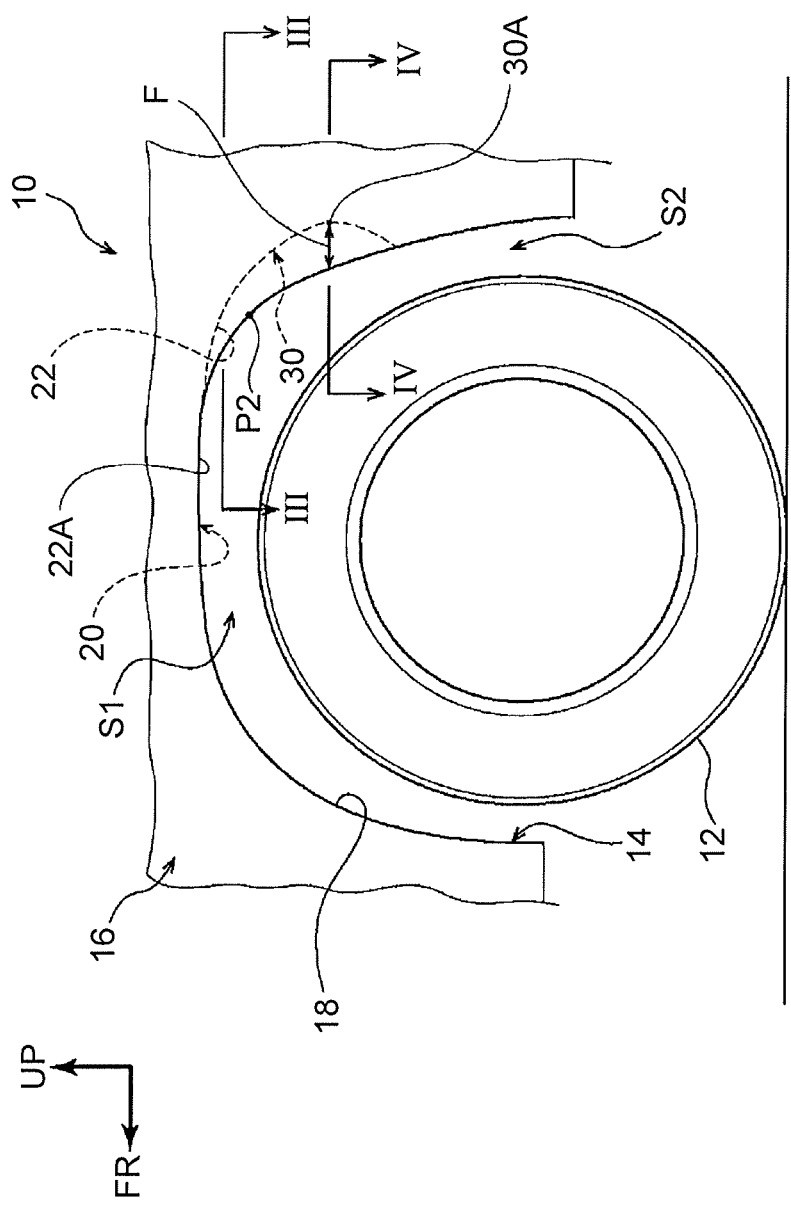
FIG. 1 is a side view showing a part of a vehicle including a fender liner according to a first embodiment.

First, a fender liner 20 according to the first embodiment will be described. As shown in FIG. 1, a front tire 12 of the vehicle 10 is housed (disposed) in the wheel house 14 on the front side.

The wheel house 14 on the front side includes at least an arch 18 of a front fender 16, and a fender liner body 22 included in the fender liner 20 is provided on the inner side of the arch 18 in the vehicle width direction. The fender liner body 22 is formed with a recess 30 ranging from an upper portion to a rear portion of the fender liner body 22.

Figure 2:
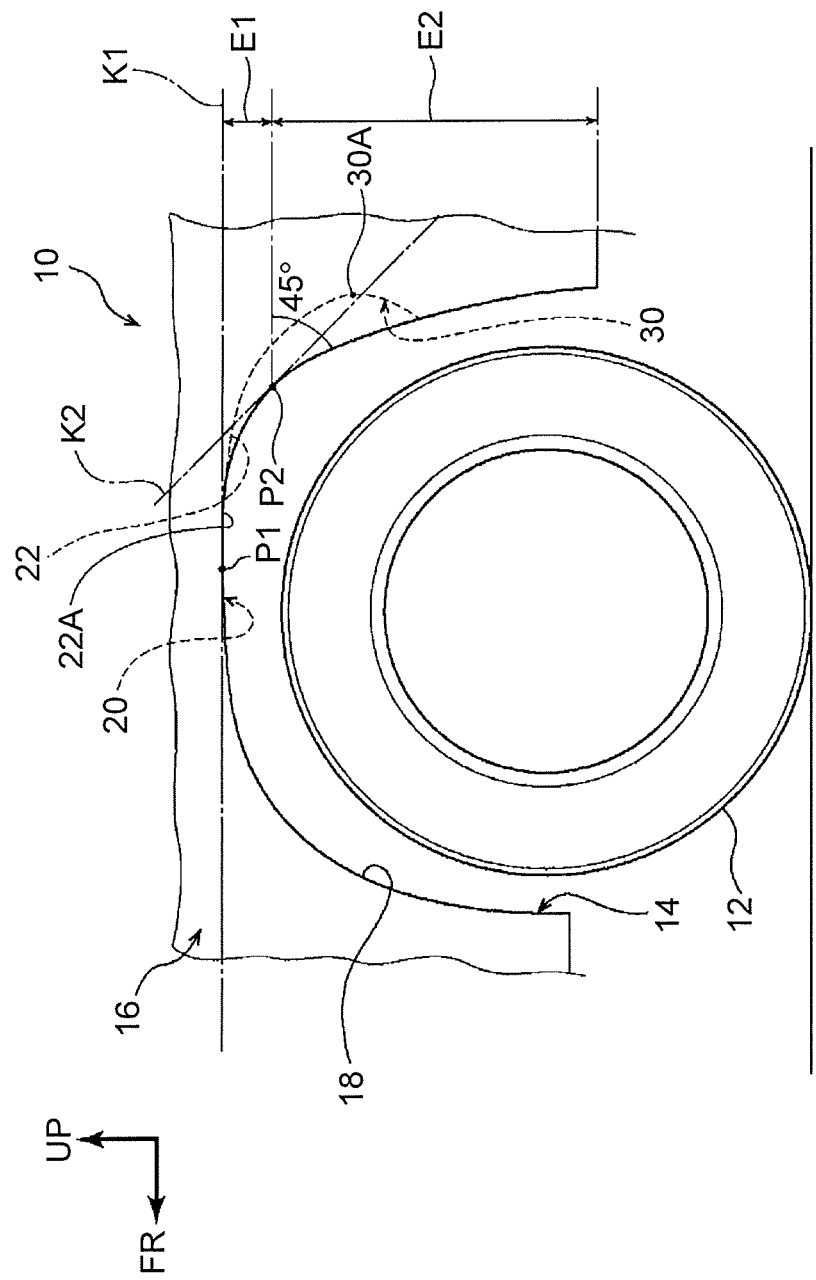
FIG. 2 is a side view showing a relationship between the fender liner according to the first embodiment, and an imaginary tangential line and an imaginary oblique line.

As shown in FIG. 2, the "upper portion" in the present embodiment, as seen in the vehicle width direction, is defined as a region E1 ranging from a contact point P1 of an imaginary tangential line K1 extending along the horizontal direction of an end 22A located on the outer side of the fender liner body 22 in the vehicle width direction to an intersection point P2 defined by the end 22A located on the outer side of the fender liner body 22 in the vehicle width direction and an imaginary oblique line K2 inclined at an angle of 45 degrees relative to the horizontal direction and the perpendicular direction.

The "rear portion" in the present embodiment is defined as a region E2 located more downward in the vehicle (ranging to a lower end of the arch 18 on the vehicle rear side) than the intersection point P2. Specifically, the upper end of the recess 30 is located more upward (frontward) than the intersection point P2, and the lower end of the recess 30 is located more downward than the intersection point P2. In other words, the recess 30 is so formed as to range across the intersection point P2.

As shown in FIG. 1 to FIG. 4, this recess 30 is formed to be greatly recessed rearward in the vehicle more in the rear portion than in the upper portion. In other words, this recess 30 is formed to have a depth gradually deeper as a depth F (see FIG. 1) along the vehicle front-rear direction goes downward, and a deepest portion 30A of the depth is located more downward than the intersection point P2.

The recess 30 illustrated in FIG. 1 and FIG. 2 is formed in a substantially arc shape having a greater curvature than that of the arch 18, as seen from the vehicle width direction. Hence, the depth of the recess 30, which is located more downward than the deepest portion 30A, becomes gradually shallower as it goes downward; however, the shape of the recess 30 is not limited to the shape illustrated in the drawing.

In the above-configured fender liner 20 according to the first embodiment, operation thereof will be described as follows.

Figure 12:
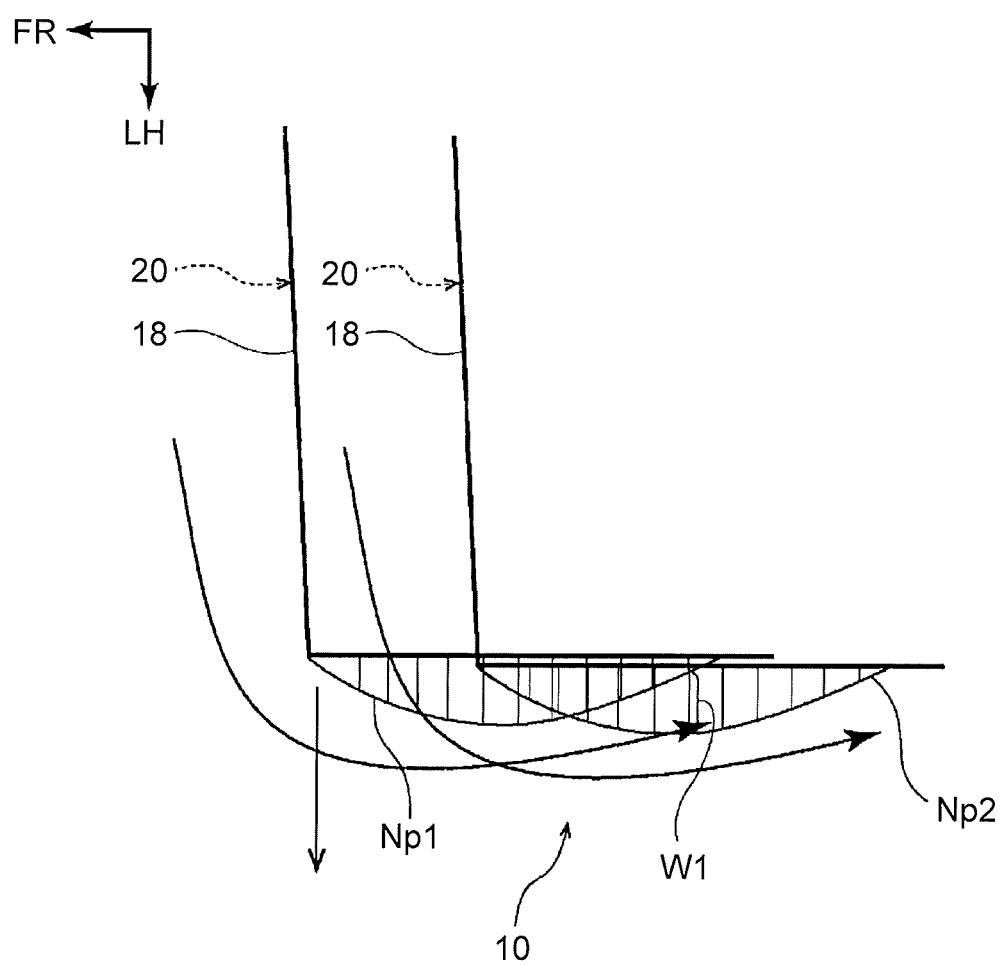
FIG. 12 is an explanatory view of a vehicle including a fender liner according to a comparative example having no recess part, the view being corresponding to FIG. 5.

Description will be started with a comparative example having no recess 30 in the fender liner body 22. In this comparative example, during traveling of the vehicle 10, as shown in FIG. 12, a difference W1 between a negative pressure Np1 generated in a clearance gap S1 defined between an upper portion of the front tire 12 and an upper portion of the fender liner 20 and a maximum value of a negative pressure Np2 generated in a clearance gap S2 defined between a rear portion of the front tire 12 and a rear portion of the fender liner 20 is great. Consequently, vortex is likely to be caused on the lateral side of the vehicle 10, and thus air resistance during the traveling of the vehicle 10 might be increased.

Figure 3:
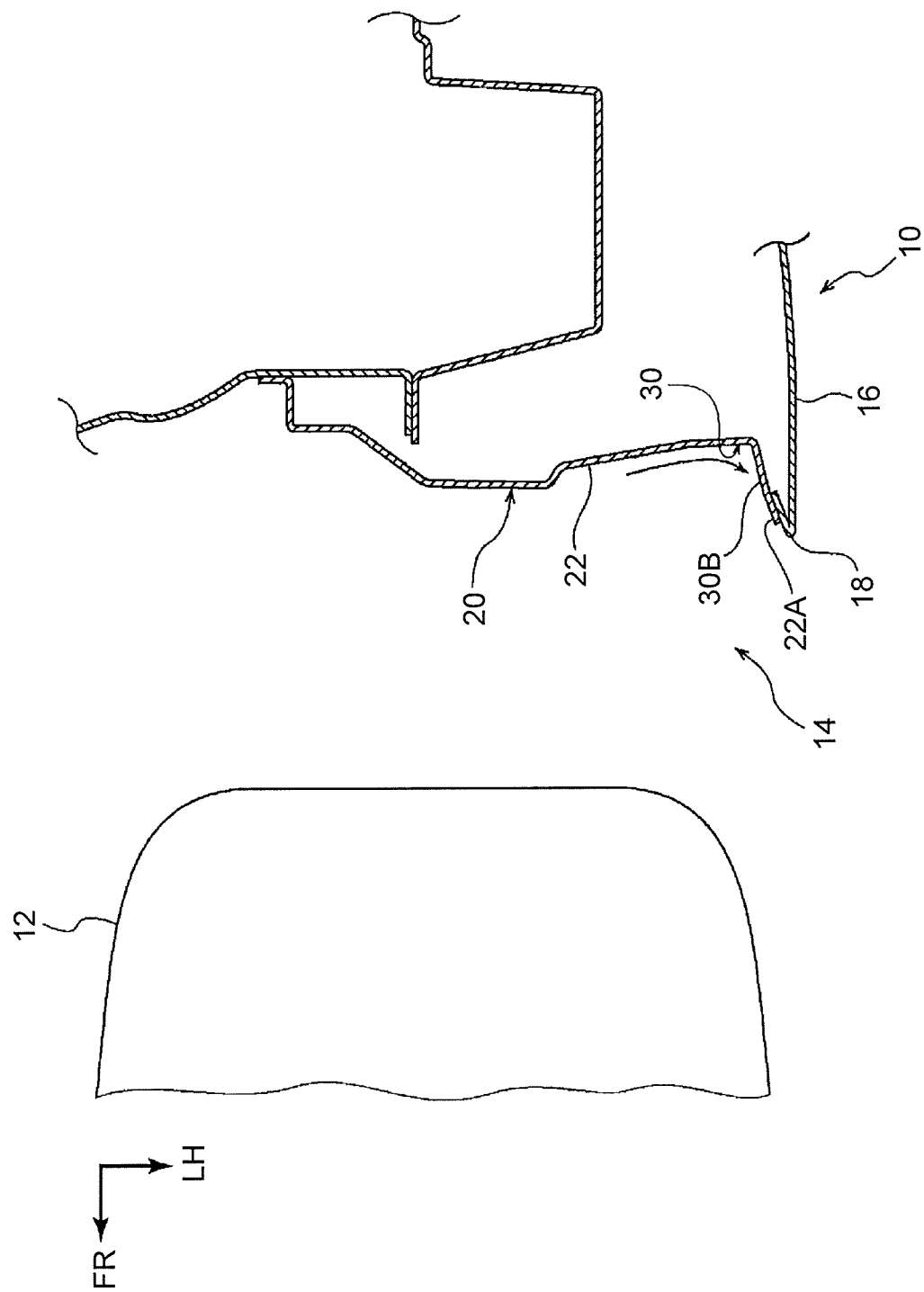
FIG. 3 is a sectional view taken along line in FIG. 1.
Figure 4:
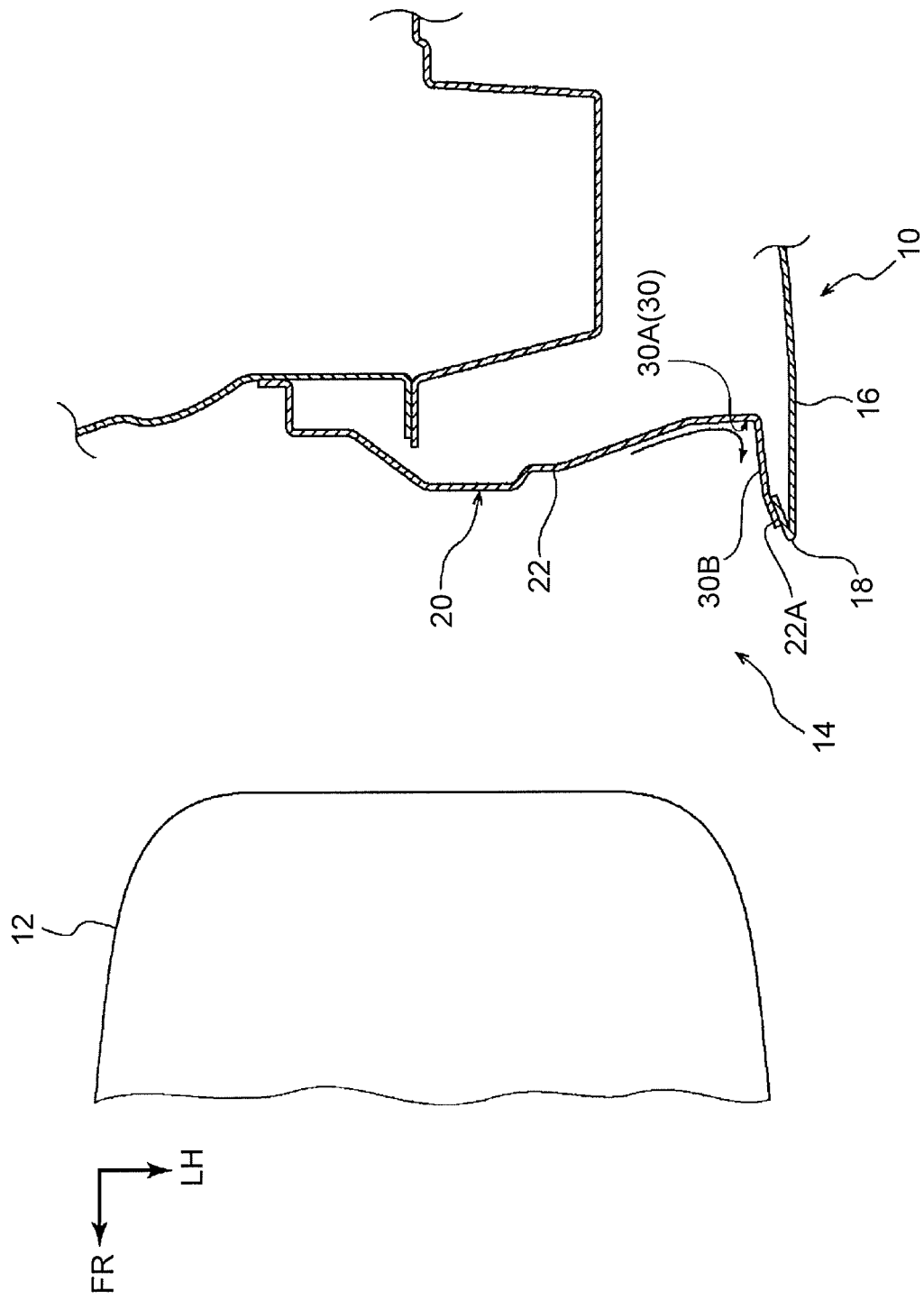
FIG. 4 is a sectional view taken along line IV-IV in FIG. 1.

To the contrary, in the case of the present embodiment, as shown in FIG. 3 and FIG. 4, the fender liner body 22 is formed with the recess 30 that is recessed gradually greatly rearward in the vehicle more in the rear portion than in the upper portion. Here, air having blown into the recess 30 is more likely to collide against a surface 30B facing the inner side of the recess 30 in the vehicle width direction as the depth of the recess 30 is deeper; thus the air is more easily returned into the inner side in the vehicle width direction, so that the air becomes more difficult to blow out from the recess 30.

This means that during the traveling of the vehicle 10, the air is more difficult to blow out to the outside of the vehicle 10 from the clearance gap S2 defined between the rear portion of the front tire 12 and the rear portion of the fender liner 20 (fender liner body 22) than from the clearance gap S1 defined between the upper portion of the front tire 12 and the upper portion of the fender liner 20 (fender liner body 22).

Figure 5:
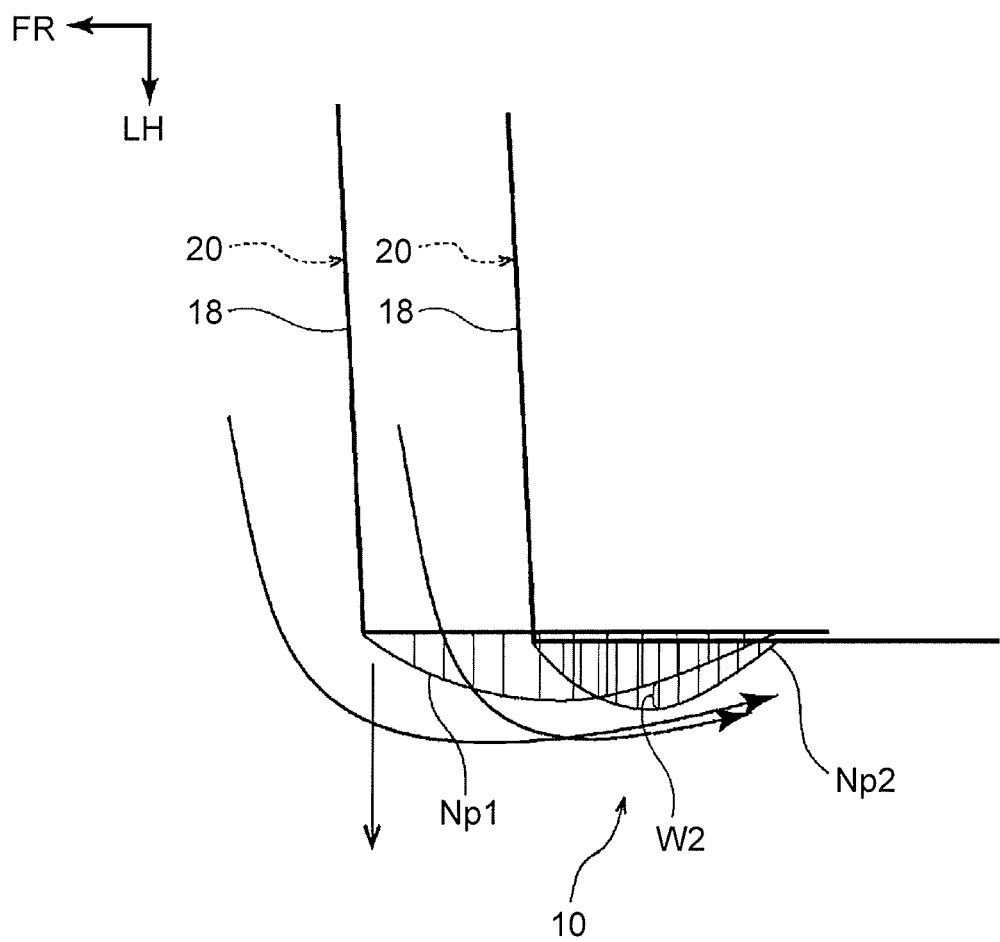
FIG. 5 is an explanatory view showing a comparison between the degree of a negative pressure generated on a lateral side of the vehicle in an upper portion of a front tire, and the degree of a negative pressure generated on the lateral side of the vehicle in a rear portion of a front tire.

Accordingly, as shown in FIG. 5, a difference W2 between the negative pressure Np1 generated in the clearance gap S1 defined between the upper portion of the front tire 12 and the upper portion of the fender liner 20 and the maximum value of the negative pressure Np2 generated in the clearance gap S2 defined between the rear portion of the front tire 12 and the rear portion of the fender liner 20 becomes smaller (generation of negative pressure is suppressed), so that generation of vortex becomes difficult on the lateral side of the vehicle 10 (generation of vortex is suppressed). Hence, the air resistance during the traveling of the vehicle 10 can be reduced.

Second Embodiment

Next, the fender liner 20 according to the second embodiment will be described. Note that equivalent components to those in the first embodiment will be denoted by the same reference numerals, and detailed description thereof (including common operation) will be appropriately omitted.

Figure 6:
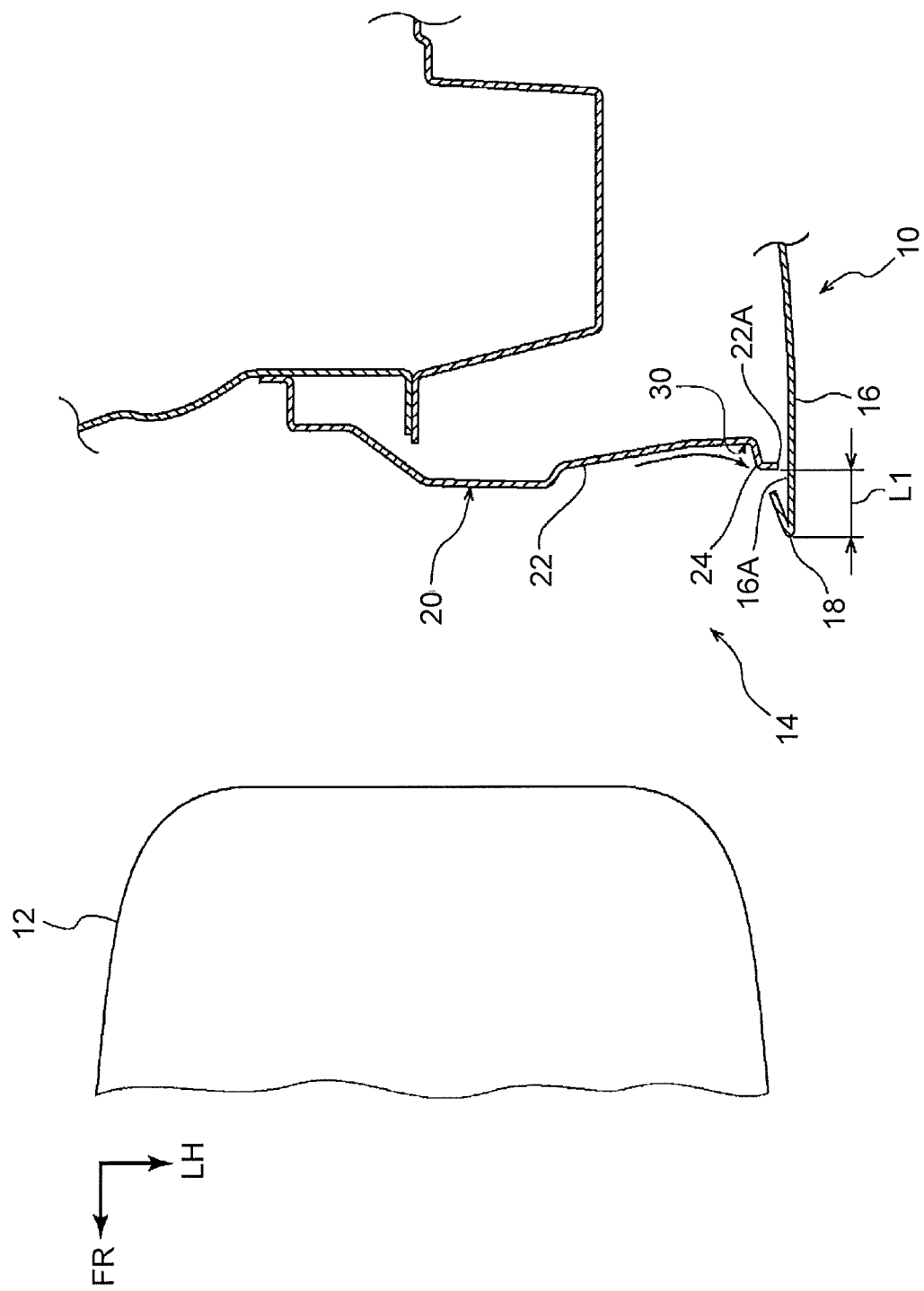
FIG. 6 is a sectional view of a fender liner according to a second embodiment, the view being corresponding to FIG. 3.
Figure 7:
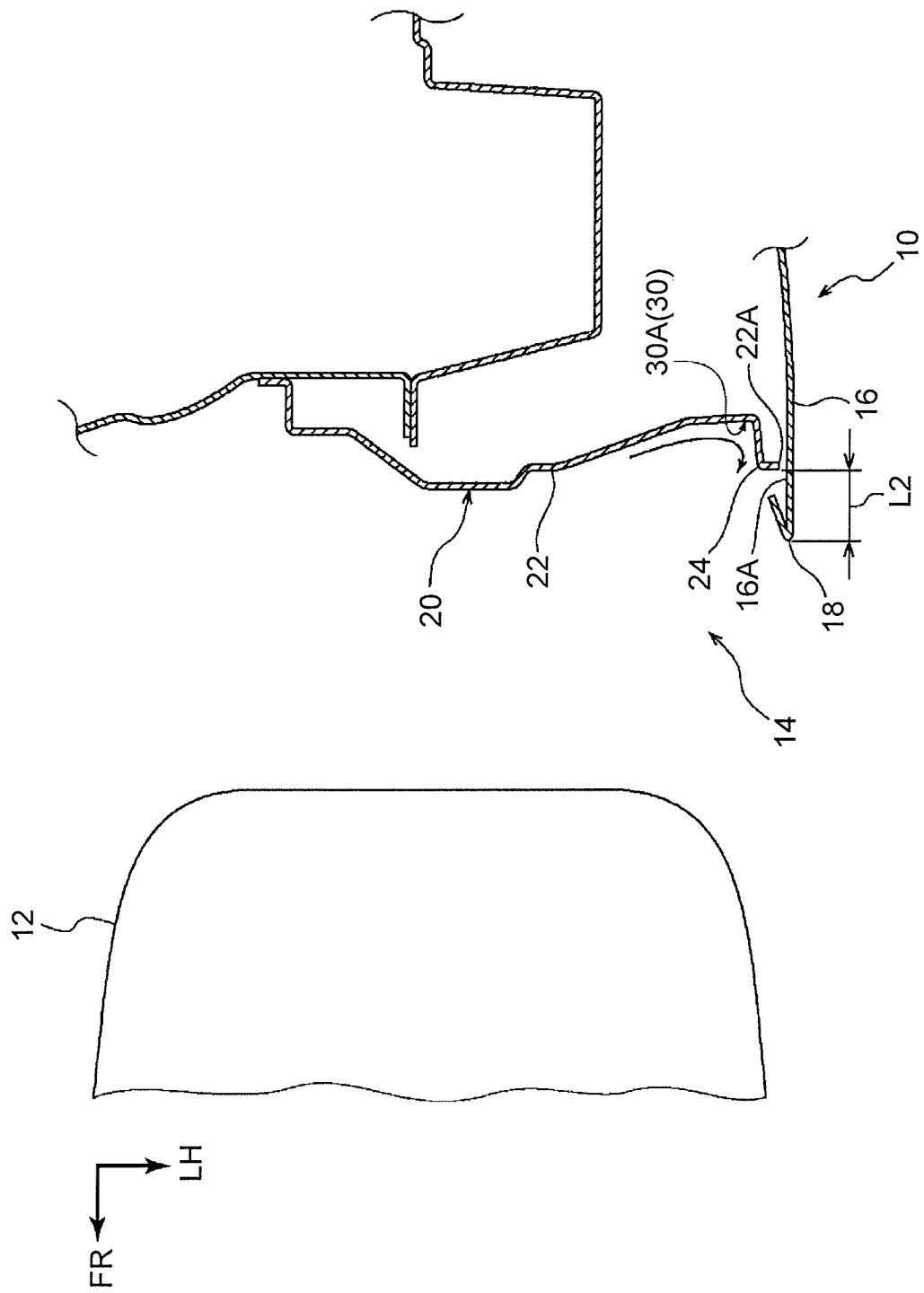
FIG. 7 is a sectional view of the fender liner according to the second embodiment, the view being corresponding to FIG. 4.

As shown in FIG. 6 and FIG. 7, in the fender liner 20 according to the second embodiment, the rear portion of the recess 30 is formed to be greatly recessed more rearward in the vehicle than the upper portion of the recess 30. An end 22A of the fender liner body 22 located more outward in the vehicle width direction than the recess 30 is formed with a bent portion 24 in a substantially "L" shape in sectional view, the bent portion 24 being formed by bending the fender liner body 22 to the outer side in the vehicle width direction. Further, a distance L2 from the arch 18 of the front fender 16 to the bent portion 24 in the rear portion is set to be longer than a distance L1 from the arch 18 of the front fender 16 to the bent portion 24 in the upper portion.

Here, if the distance L2 in the rear portion is longer than the distance L1 in the upper portion, the air having blown into the recess 30 collides against a surface (inner surface) 16A of the front fender 16 that is located between the arch 18 and the bent portion 24 and faces inward in the vehicle width direction, and thus the air is more likely to be returned inward in the vehicle width direction; and accordingly, the air is further more difficult to blow out from the inside of the recess 30.

That is, during the traveling of the vehicle 10, the air is further more difficult to blow out to the outside of the vehicle 10 from the clearance gap S2 defined between the rear portion of the front tire 12 and the rear portion of the fender liner 20 (fender liner body 22) than from the clearance gap S1 defined between the upper portion of the front tire 12 and the upper portion of the fender liner 20 (fender liner body 22).

Therefore, in the clearance gap S2 defined between the rear portion of the front tire 12 and the rear portion of the fender liner 20, the generation of negative pressure is suppressed, so that vortex becomes further more difficult to be generated on the lateral side of the vehicle 10 (generation of vortex is suppressed or prevented). Therefore, it is possible to further reduce the air resistance during the traveling of the vehicle 10.

Third Embodiment

Next, the fender liner 20 according to the third embodiment will be described. Note that equivalent components to those in the first embodiment and the second embodiment will be denoted by the same reference numerals, and detailed description thereof (including common operation) will be appropriately omitted.

Figure 8:
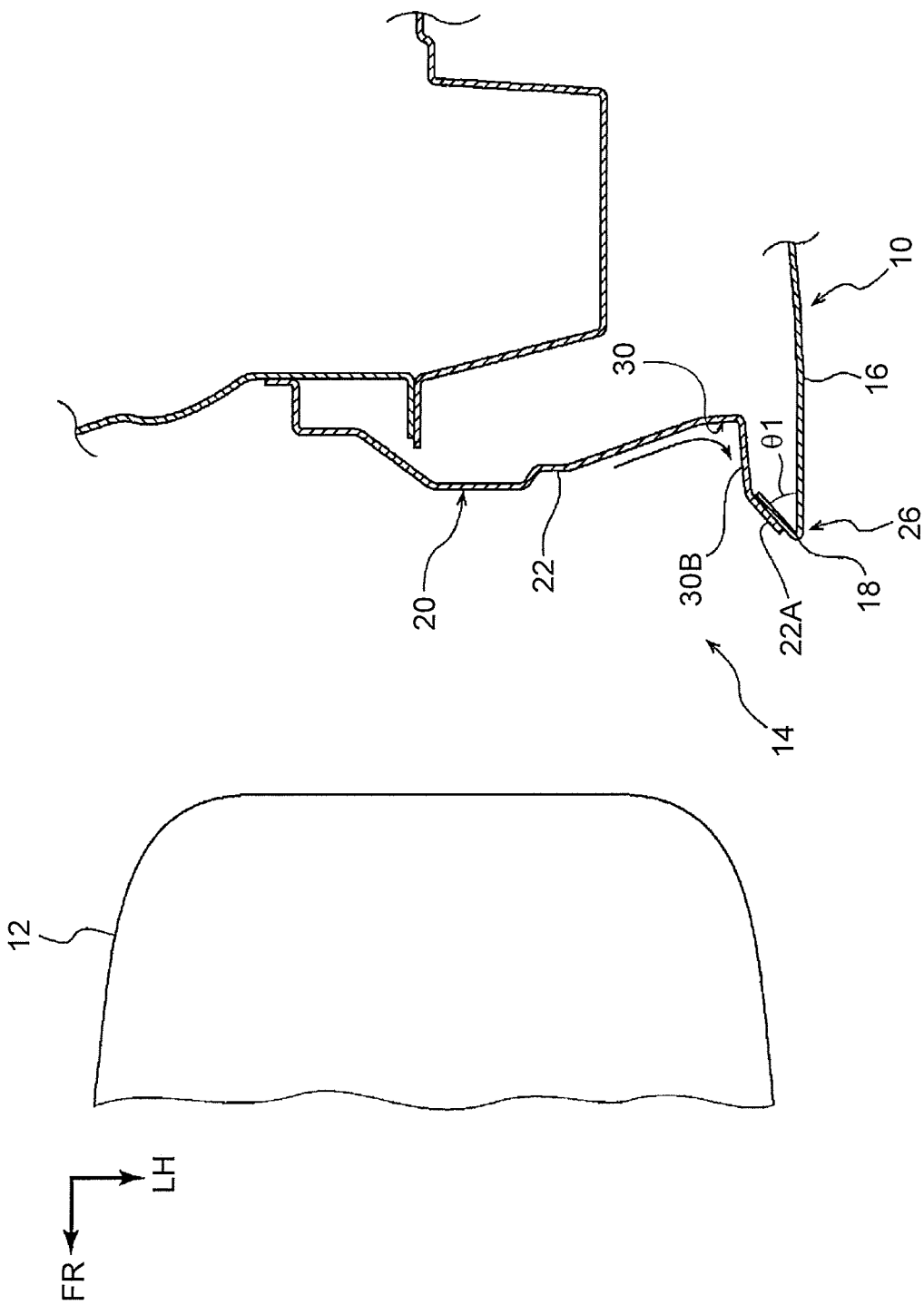
FIG. 8 is a sectional view of a fender liner according to a third embodiment, the view being corresponding to FIG. 3.
Figure 9:
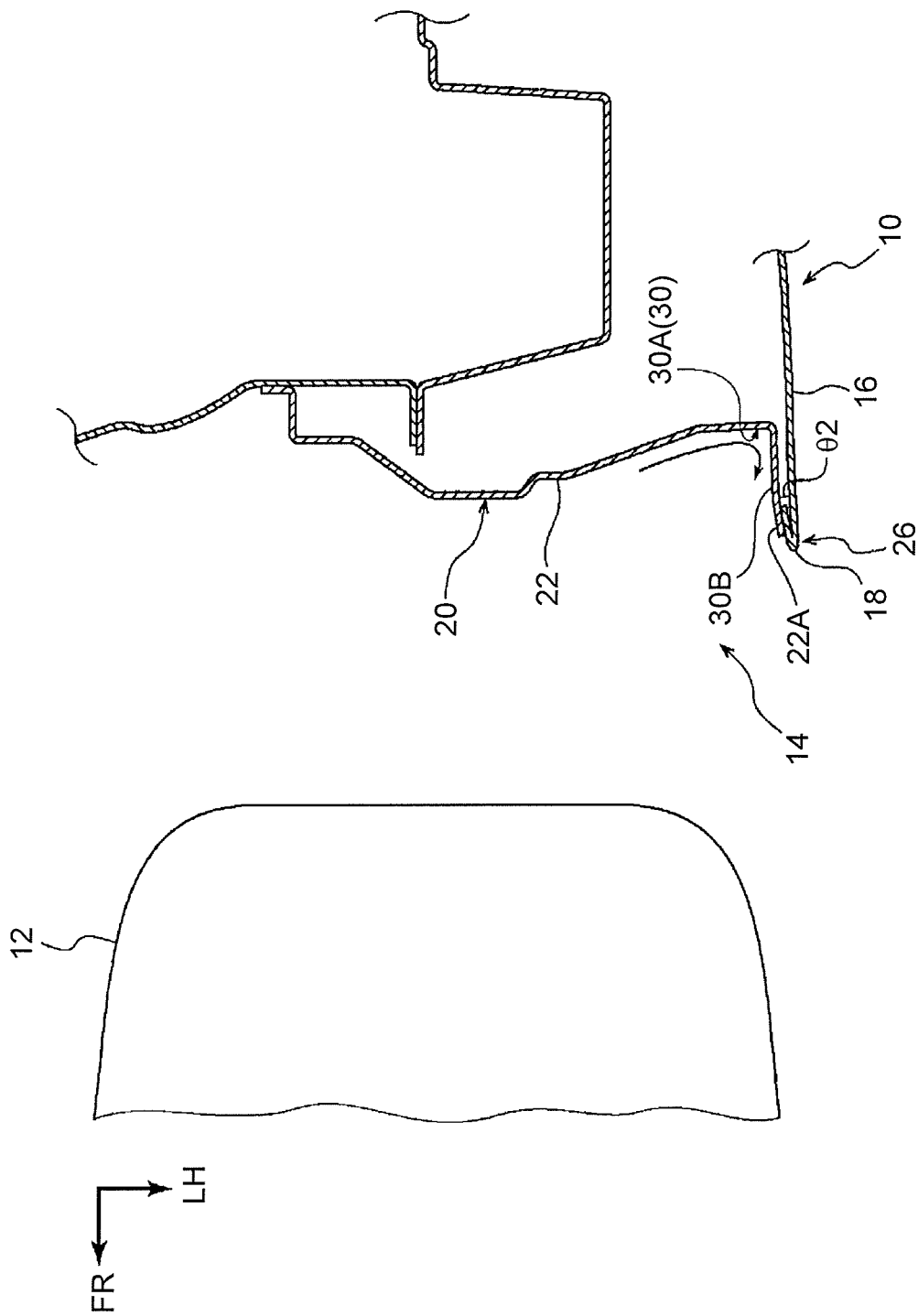
FIG. 9 is a sectional view of the fender liner according to the third embodiment, the view being corresponding to FIG. 4.

As shown in FIG. 8 and FIG. 9, the fender liner 20 according to the third embodiment is different from the first embodiment and the second embodiment in that the recess 30 is formed to have a constant depth from the upper portion to the rear portion. The end 22A of the fender liner body 22 located more outward in the vehicle width direction than the recess 30 is joined to the arch 18 of the front fender 16 so as to form an edge 26 projecting at a sharp angle in sectional view. Furthermore, an interior angle θ2 of the edge 26 in the rear portion is set to be smaller than an interior angle θ1 of the edge 26 in the upper portion.

Here, if the interior angle θ2 of the edge 26 in the rear portion is smaller than the interior angle θ1 of the edge 26 in the upper portion, the air having blown into the recess 30 collides against a surface of the edge 26 that faces inward in the vehicle width direction (surface 30B facing inward in the vehicle width direction in the recess 30), and is thus more likely to be returned inward in the vehicle width direction, which makes the air further more difficult to blow out from the inside of the recess 30.

That is, during the traveling of the vehicle 10, the air is further more difficult to blow out to the outside of vehicle 10 from the clearance gap S2 defined between the rear portion of the front tire 12 and the rear portion of the fender liner 20 (fender liner body 22) than from the clearance gap S1 defined between the upper portion of the front tire 12 and the upper portion of the fender liner 20 (fender liner body 22).

Accordingly, the generation of negative pressure is suppressed in the clearance gap S2 defined between the rear portion of the front tire 12 and the rear portion of the fender liner 20, and thus the generation of vortex becomes further more difficult on the lateral side of the vehicle 10 (generation of vortex is suppressed or prevented). Accordingly, the air resistance during the traveling of the vehicle 10 can be further reduced.

In the third embodiment, as similar to the first embodiment and the second embodiment, the rear portion of the recess 30 may be formed to be greatly recessed more rearward in the vehicle than the upper portion of the recess 30. In this case, the air having blown into the recess 30 becomes further more difficult to blow out from the inside of the recess 30 in this rear portion.

Fourth Embodiment

Finally, the fender liner 20 according to the fourth embodiment will be described. Note that equivalent components to those in the first embodiment to the third embodiment will be denoted by the same reference numerals, and detailed description thereof (including common operation) will be appropriately omitted.

Figure 10:
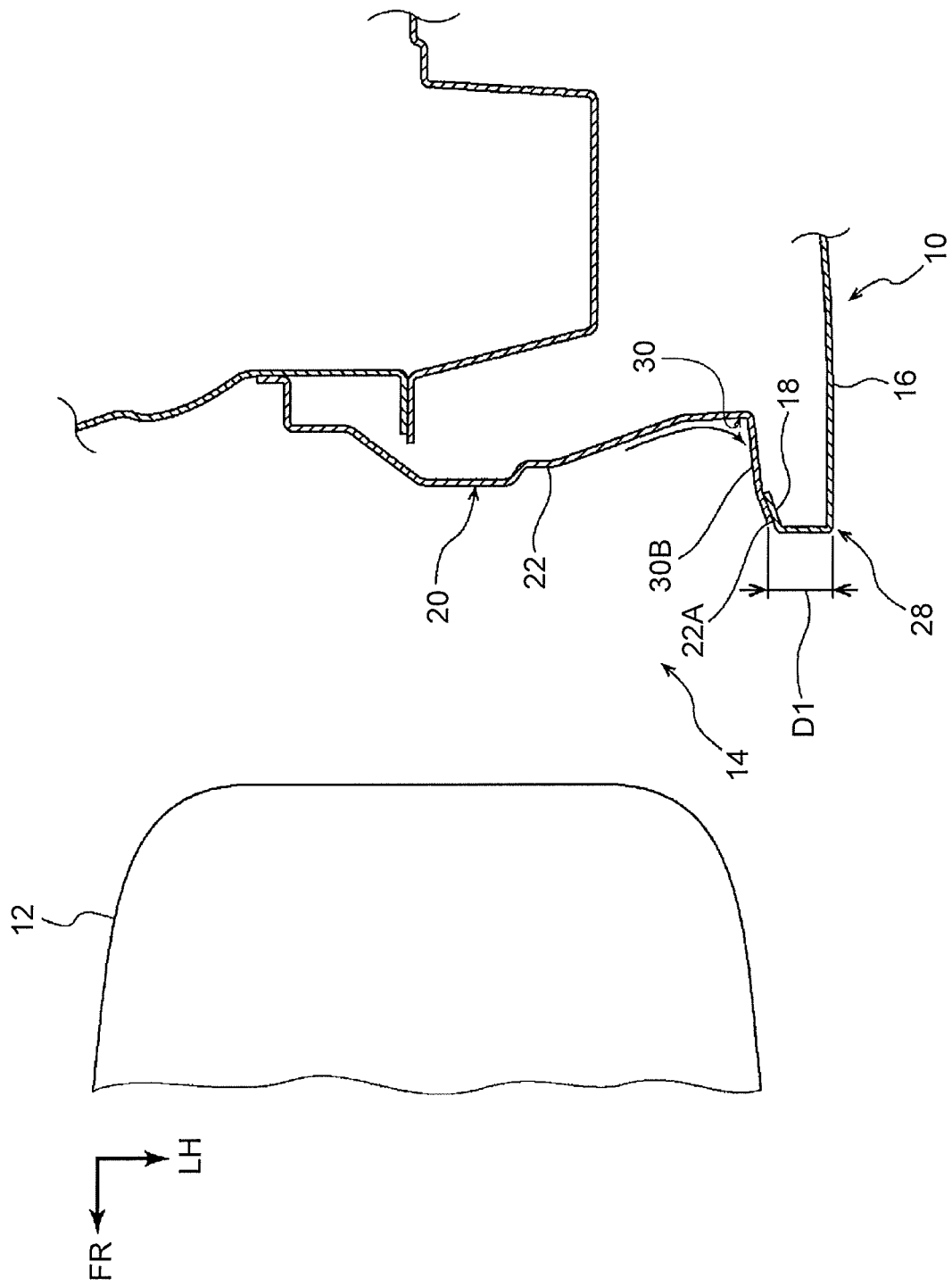
FIG. 10 is a sectional view of a fender liner according to a fourth embodiment, the view being corresponding to FIG. 3.
Figure 11:
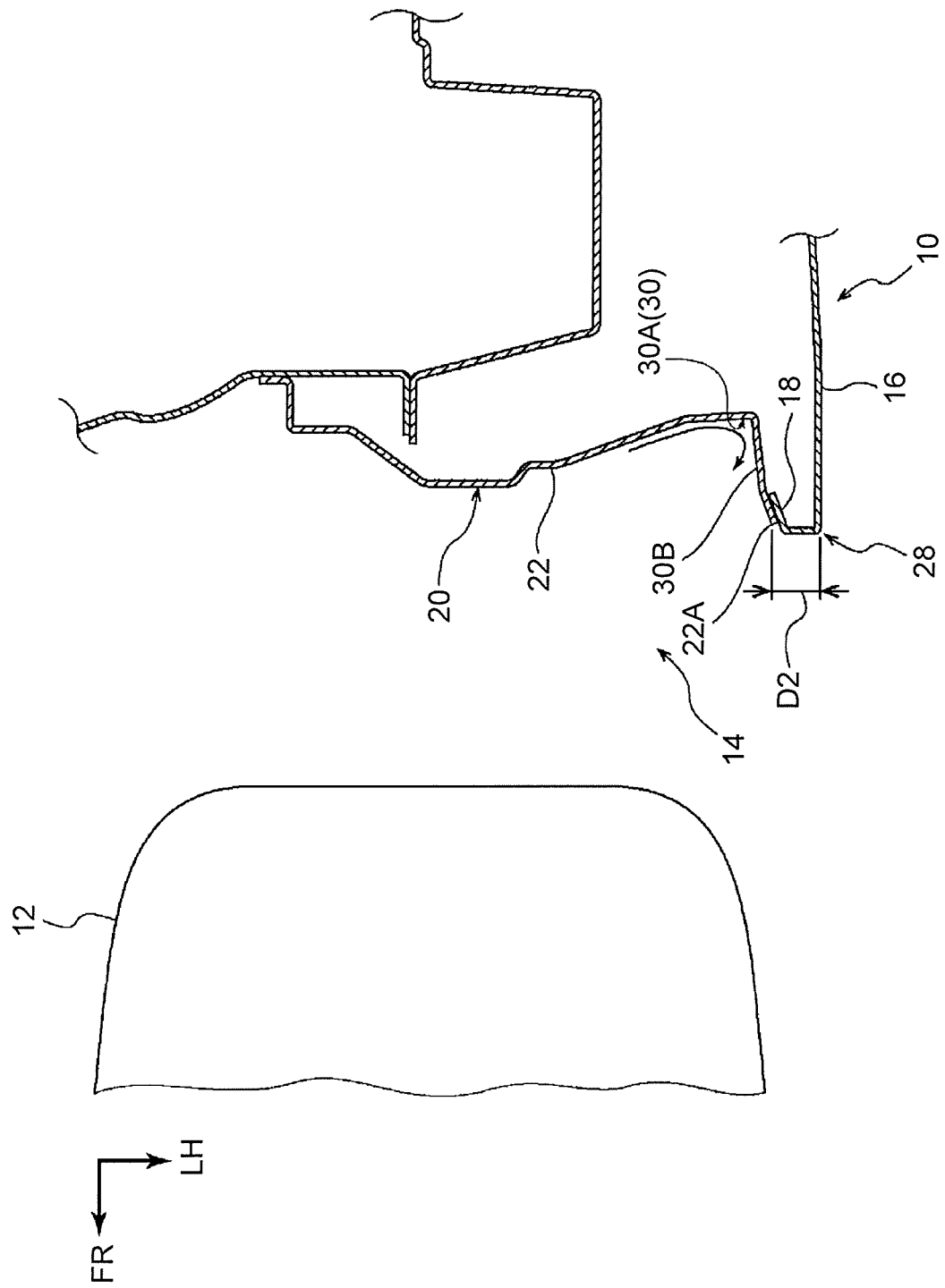
FIG. 11 is a sectional view of the fender liner according to the fourth embodiment, the view being corresponding to FIG. 4.

As shown in FIG. 10 and FIG. 11, the fender liner 20 according to the fourth embodiment is different from those of the first embodiment and the second embodiment (but similar to the third embodiment) in that the recess 30 is formed to have a constant depth from the upper portion to the rear portion. In addition, the end 22A of the fender liner body 22 located more outward in vehicle width direction than the recess 30 is joined to the arch 18 of the front fender 16 so as to form a projection 28 projecting in a rectangular shape in sectional view. Furthermore, a thickness D2 of the projection 28 along the vehicle width direction in the rear portion is set to be smaller (thinner) than a thickness D1 of the projection 28 along the vehicle width direction in the upper portion.

Here, if the thickness D2 of the projection 28 in the rear portion is smaller (thinner) than the thickness D1 of the projection 28 in the upper portion, the width of the recess 30 becomes wider. Accordingly, the air having blown into the recess 30 collides against a surface of the projection 28 facing inward in the vehicle width direction (surface 30B facing inward in the vehicle width direction in the recess 30), and thus is more likely to be returned inward in the vehicle width direction, which makes the air further more difficult to blow out from the inside of the recess 30.

That is, during the traveling of the vehicle 10, the air is further more difficult to blow out to the outside of vehicle 10 from the clearance gap S2 defined between the rear portion of the front tire 12 and the rear portion of the fender liner 20 (fender liner body 22) than from the clearance gap S1 defined between the upper portion of the front tire 12 and the upper portion of the fender liner 20 (fender liner body 22).

Accordingly, the generation of negative pressure is suppressed in the clearance gap S2 defined between the rear portion of the front tire 12 and the rear portion of the fender liner 20, and thus vortex becomes further more difficult to be generated on the lateral side of the vehicle 10 (generation of vortex is suppressed or prevented). Accordingly, the air resistance during the traveling of the vehicle 10 can be further reduced.

In the fourth embodiment, as similar to the first embodiment and the second embodiment, the rear portion of the recess 30 may be formed to be greatly recessed more rearward in the vehicle than the upper portion of the recess 30. In this case, the air having blown into the recess 30 becomes further more difficult to blow out from the inside of the recess 30 in this rear portion.

As aforementioned, the fender liner 20 according to the present embodiment has been described with reference to the drawings, but the fender liner 20 according to the present embodiment is not limited to those shown in the drawings, and appropriate design modifications may be made without departing from the scope of the present disclosure. For example, the fender liner 20 according to the present embodiment may be applied to the wheel house 14 on the rear side of the vehicle 10. The shape of the projection 28 is not limited to the rectangular shape.

The interior angle of the edge 26 and the thickness of the projection 28 may be configured to be gradually smaller as they go from the upper portion to the rear portion; however the present disclosure is not limited to this. For example, it may be configured that a plurality of steps is formed in the middle portion so as to set the interior angle of the edge 26 and the thickness of the projection 28 to be smaller in a step-by-step manner in the rear portion than in the upper portion.

Similarly, the distance between the arch 18 and the bent portion 24 may be configured to be gradually longer as they go from the upper portion to the rear portion; however, the present disclosure is not limited to this. For example, it may be configured that a plurality of steps is formed in the middle portion so as to set the distance to be longer in a step-by-step manner in the rear portion than in the upper portion.

What is claimed is:

1. A fender liner comprising
   a fender liner body provided in an arch of a fender included in a wheel house of a vehicle,
   wherein
   the fender liner body includes a recess that is provided from an upper portion of the fender liner body in a vehicle height direction to a rear portion of the fender liner body in a vehicle front-rear direction and is greatly recessed rearward in the vehicle front-rear direction more in the rear portion than in the upper portion, and
   the recess includes a deepest portion in the rear portion only, the deepest portion being a portion at which a depth of the recess along the vehicle front-rear direction becomes the deepest.

2. The fender liner according to claim 1, further comprising
   an edge formed by an end of the fender liner body located more outward in a vehicle width direction than the recess, and the arch of the fender joined to each other, the edge projecting in a sharp angled shape in sectional view perpendicular to the vehicle height direction, wherein
   an interior angle of the edge in the rear portion is set to be smaller than an interior angle of the edge in the upper portion.

3. The fender liner according to claim 1, further comprising
   a projection formed by an end of the fender liner body located more outward in a vehicle width direction than the recess, and the arch joined to each other, the projection projecting in a rectangular shape in sectional view perpendicular to the vehicle height direction, wherein
   a thickness of the projection along the vehicle width direction in the rear portion is smaller than a thickness of the projection along the vehicle width direction in the upper portion.

4. The fender liner according to claim 1, wherein
   the fender liner body includes a bent portion that is provided at an end of the fender liner body located more outward in a vehicle width direction than the recess and is formed in a substantially L shape in sectional view perpendicular to the vehicle height direction, and
   a distance from the arch of the fender to the bent portion in the rear portion is longer than a distance from the arch of the fender to the bent portion in the upper portion.

5. The fender liner according to claim 1, wherein
   the recess is formed to be greatly recessed rearward in the vehicle more in the rear portion than in the upper portion.

6. A fender liner comprising:
   a fender liner body provided in an arch of a fender included in a wheel house of a vehicle, the fender liner body including a recess that is provided from an upper portion in a vehicle height direction of the fender liner body to a rear portion in a vehicle front-rear direction of the fender liner body; and
   an edge formed by an end of the fender liner body located more outward in a vehicle width direction than the recess and the arch joined to each other, the edge projecting in a sharp angled shape in sectional view perpendicular to the vehicle height direction, the edge having a smaller interior angle in the rear portion than an interior angle in the upper portion.

7. A fender liner comprising:
   a fender liner body provided in an arch of a fender included in a wheel house of a vehicle, the fender liner body including a recess that is provided from an upper portion in a vehicle height direction of the fender liner body to a rear portion in a vehicle front-rear direction of the fender liner body; and
   a projection formed by an end of the fender liner body located more outward in a vehicle width direction than the recess, and the arch joined to each other, the projection projecting in a rectangular shape in sectional view perpendicular to the vehicle height direction, wherein
   a thickness of the projection along the vehicle width direction in the rear portion is smaller than a thickness of the projection along the vehicle width direction in the upper portion.

8. The fender liner according to claim 1, wherein
   as seen in a vehicle width direction, the upper portion is defined as a region ranging from a contact point of an imaginary tangential line of an end of the fender liner body located more outward in the vehicle width direction than the recess, the imaginary tangential line extending along the vehicle front-rear direction, to an intersection point between the end of the fender liner body and an imaginary oblique line inclined at an angle of 45 degrees relative to the vehicle front-rear direction and the vehicle height direction, and
   the rear portion is defined as a region located more downward in the vehicle height direction than the intersection point.

9. The fender liner according to claim 6, wherein
   as seen in the vehicle width direction, the upper portion is defined as a region ranging from a contact point of an imaginary tangential line of the end of the fender liner body located more outward in the vehicle width direction than the recess, the imaginary tangential line extending along the vehicle front-rear direction, to an intersection point between the end of the fender liner body and an imaginary oblique line inclined at an angle of 45 degrees relative to the vehicle front-rear direction and the vehicle height direction, and
   the rear portion is defined as a region located more downward in the vehicle height direction than the intersection point.

10. The fender liner according to claim 7, wherein
as seen in the vehicle width direction, the upper portion is defined as a region ranging from a contact point of an imaginary tangential line of the end of the fender liner body located more outward in the vehicle width direction than the recess, the imaginary tangential line extending along the vehicle front-rear direction, to an intersection point between the end of the fender liner body and an imaginary oblique line inclined at an angle of 45 degrees relative to the vehicle front-rear direction and the vehicle height direction, and
the rear portion is defined as a region located more downward in the vehicle height direction than the intersection point.

* * * * *